May 4, 1937. H. GOLDEN 2,079,346
ANTIRATTLING DEVICE FOR DOORS
Filed June 3, 1936

INVENTOR
Harry Golden
BY
C. James Cottrell
ATTORNEY

Patented May 4, 1937

2,079,346

UNITED STATES PATENT OFFICE 2,079,346

ANTIRATTLING DEVICE FOR DOORS

Harry Golden, New York, N. Y., assignor to Magna Products Corp., New York, N. Y.

Application June 3, 1936, Serial No. 83,211

1 Claim. (Cl. 16—86)

This invention relates to improvements in devices for preventing rattling of doors of automobiles and the like.

Anti-rattling devices as have been heretofore provided for automobile doors comprise generally blocks of rubber or a similar resilient material, which is positioned between the door and the main body of the automobile. Such devices have been found objectionable in that after a certain period of use they become worn and ineffective; and instead of preventing rattling of the door, actually cause a relatively large space between the door and body, which tends to increase the rattling of the door.

It is an object of this invention to provide an anti-rattling device for automobile doors which will remain effective regardless of the period of use.

A further object is the provision of anti-rattling device comprising a conical spring positioned in a rubber casing, which can be readily attached to an automobile door by using one of the door hinge screws.

These and other objects are attained by the novel construction, combination and arrangement of parts hereinafter described and shown in the accompanying drawing, constituting a material part of this disclosure, and in which.

Figure 1:
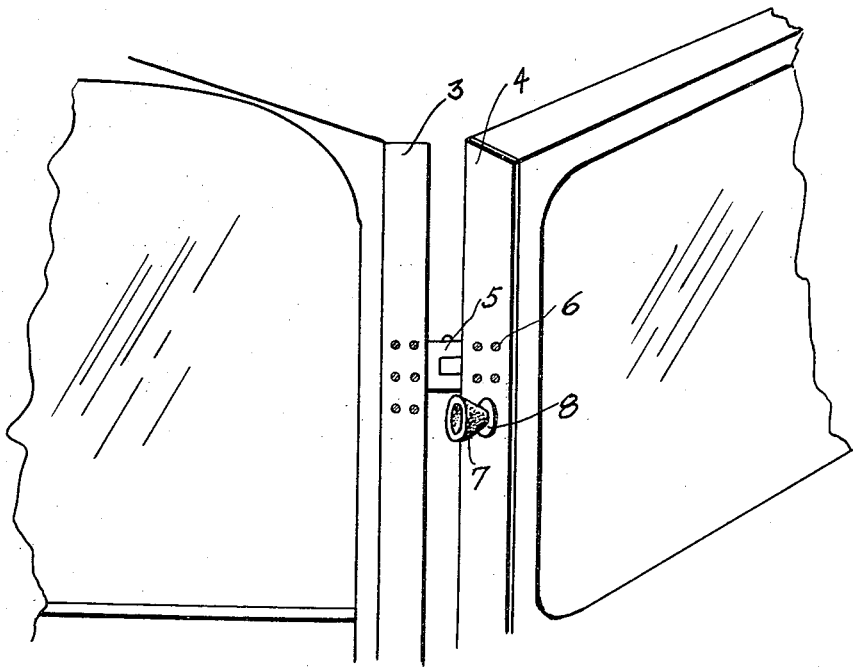
Fig. 1 is a perspective view showing my anti-rattling device attached to an automobile door.

Referring to the drawing, the device is shown to comprise a conical spring 10, of the bed-spring type in which all of the coils can be forced simultaneously into a common plane. The spring 10 is attached to a grommet 11, and then positioned in a casing 7 of rubber or similar resilient material, the casing 7 having an annular flange 9 overlapping the large coil of the spring.

Figure 2:
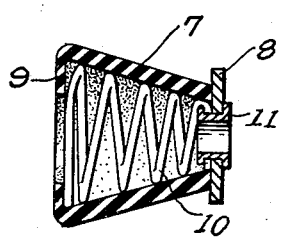
Fig. 2 is a sectional view of my anti-rattling device for doors.

After the spring 10 has been positioned in the casing 7, the grommet 11 is attached to a washer 8 to provide a structure as shown in Fig. 2.

In application, one of the screws 6 of the hinge 5 connecting the door 4 and the main body 3 of the automobile is removed, and the anti-rattling device positioned over the screw hole, after which the screw is again inserted in its hole to fasten the anti-rattling device to the door 4. When the door is closed, the anti-rattling device will be compressed and prevent rattling of the door.

It will be seen that my device will always function to prevent rattling regardless of the length of time it may be used, as the spring 10 will remain effective despite the extent to which the rubber casing 7 may become worn.

From the above description, it will be seen that I have provided a simple and effective device for preventing rattling of automobile doors or other doors, which can be readily and conveniently attached without alteration of the door or requiring special tools.

The foregoing disclosure is to be regarded as descriptive and illustrative only, and not as restrictive or limitative of the invention, of which obviously an embodiment may be constructed including modifications without departing from the general scope herein indicated and denoted in the appended claim.

Having thus described my invention, what I claim as new and desire to secure by Letters Patent, is:

In an anti-rattling device for doors, a conical spring, a rubber casing encircling the spring and having an annular flange covering the large coil of the spring, a washer, and a grommet connecting the spring and washer.

HARRY GOLDEN.